United States Patent [19]

Doll

[11] Patent Number: 4,532,101
[45] Date of Patent: Jul. 30, 1985

[54] ARTICULATED LIMITER BLADE FOR A TOKAMAK FUSION REACTOR

[75] Inventor: David W. Doll, San Diego, Calif.

[73] Assignee: The United States of America as represented by the United States Department of Energy, Washington, D.C.

[21] Appl. No.: 435,791

[22] Filed: Oct. 21, 1982

[51] Int. Cl.³ .................................................. G21B 1/00
[52] U.S. Cl. ..................................... 376/136; 376/143
[58] Field of Search ................................. 376/136, 143

[56] References Cited

FOREIGN PATENT DOCUMENTS

| 0007279 | 3/1976 | Japan | 376/136 |
| 0024995 | 3/1978 | Japan | 376/136 |
| 0158592 | 12/1979 | Japan | 376/136 |

OTHER PUBLICATIONS

Fusion Technology, vol. 2, 1978, Doll et al., pp. 841–848.
Thin Solid Films, vol. 73, 1980, Ulrickson et al., pp. 133–138.
The Technology of Controlled Nuclear Fusion, vol. II, 7/81, Citrolo et al., pp. 1034–1037.
Proc. of 9th Symp. in Eng. Problems of Fusion Research, Oct. 26–29, 1981, Doll et al., pp. 1654–1657.
Conf. 9th Symposium on Engineering Problems of Fusion Research, Chicago, Ill, (26–29 Oct., 1981), Cecchi (I), pp. 1378–1382.
INTOR-Zero Phase, report on workshop held in Vienna, 1979, IAEA, Vienna, 1980, pp. 324–329.
Proc. of Seventh Symposium on Engineering Problems of Fusion Research, Knoxville, Tenn., Oct. 1977, pp. 260–268, Condolff et al.
J. of Nuclear Materials 93 & 94, (1980), pp. 28–43, Cecchi (II).
Conf. 9th Symposium on Engineering Problems of Fusion Research, Chicago, Ill, Oct. 26–29, 1981, Paper 5E-04, pp. 1383–1389, Winkler et al.

Primary Examiner—Harvey E. Behrend
Attorney, Agent, or Firm—Jeannette M. Walder; Paul A. Gottlieb; Judson R. Hightower

[57] ABSTRACT

A limiter blade for a large tokomak fusion reactor includes three articulated blade sections for enabling the limiter blade to be adjusted for plasmas of different sizes. Each blade section is formed of a rigid backing plate carrying graphite tiles coated with titanium carbide, and the limiter blade forms a generally elliptic contour in both the poloidal and toroidal directions to uniformly distribute the heat flow to the blade. The limiter blade includes a central blade section movable along the major radius of the vacuum vessel, and upper and lower pivotal blade sections which may be pivoted by linear actuators having rollers held to the back surface of the pivotal blade sections.

22 Claims, 18 Drawing Figures

ARTICULATED LIMITER BLADE FOR A TOKAMAK FUSION REACTOR

BACKGROUND OF THE INVENTION

The United States Government has rights to this invention pursuant to Contract No. DE-AL02-76-CH-03073 and Contract No. DE-AT03-76ET-51011, between the United States Department of Energy and General Atomic Company.

The present invention relates to a limiter blade for a tokamak fusion reactor, and more particularly, to an articulated limiter blade capable of withstanding the high stresses that may be encountered in large reactors while being adjustable for use with plasmas of different sizes.

Efforts to produce power from controlled nuclear fusion have centered largely upon fusing isotopes of hydrogen in a tokamak reactor wherein a plasma of ionized hydrogen, deuterium, or deuterium and tritium atoms must be given sufficient thermal energy to cause nuclei to fuse with the release of substantial energy. The plasmas of such reactors must be heated to exceedingly high temperatures which prevent containment of the plasma by material walls. Consequently, the plasma of a tokamak reactor is confined within a rather complex magnetic field.

The confining magnetic field of a tokamak reactor is generally toroidal with the magnetic field lines made to spiral in the toroidal direction by a poloidal field produced by current flowing in the plasma. Current flow through the plasma can also be used to provide ohmic heating of the plasma, although ohmic heating alone may often not be sufficient to attain the necessary plasma temperatures due largely to a decrease in the resistance of the plasma with increasing temperatures. Consequently, the plasma may also be heated by adiabatic compression of the plasma by constricting the confining magnetic field, or injection into the plasma of a neutral beam of highly energetic particles.

Although the plasma of a tokamak reactor is confined by a magnetic field, the vacuum chamber housing the plasma typically includes limiter blades serving to define the size and shape of the confined plasma. These limiter blades must be able to withstand not only tremendous thermal stresses, but also the large plasma currents that may be discharged through the blades during faults. Additionally, substantial mechanical loading of the limiter blades may result from plasma disruptions as eddy currents induced in the limiter blades react with the rapidly changing magnetic field.

In the Tokamak Fusion Test Reactor (TFTR) presently being developed, plasmas will be tested to verify advanced engineering concepts for a large tokamak reactor using various plasmas, including a deuterium-tritium (D-T) plasma believed to be a prime candidate for commercial reactors. The TFTR will be operated under various test conditions including the use of plasmas of different sizes and, accordingly, the TFTR must include limiter blades that can not only withstand the various stresses that may be encountered during operation under various conditions, but may also be movable. Additionally, the reaction products of D-T fusion include highly energetic neutrons which may irradiate the limiter blades. These blades, therefore, must be capable of remote handling for inspection maintenance or removal.

Furthermore, it is anticipated that future tokamak reactors will require movable limiter blades to accomodate plasmas of different or changing sizes, and thus, for example, enable the heating of the plasmas by various techniques.

SUMMARY OF THE INVENTION

Accordingly, it is an object of the present invention to provide limiter blades which may be adjusted for use with plasmas of different sizes and yet may still withstand the stresses expected to be encountered. It is another object of the present invention to provide such a limiter blade which can be removed easily from the reactor by remote handling.

According to the present invention, a limiter blade for serving to define the outer boundary of a plasma confined in a vacuum chamber of a tokamak fusion reactor includes a central blade section arranged generally perpendicularly to the major axis of the vacuum chamber and movable horizontally. An upper blade section and a lower blade section are connected pivotally to respective end portions of the central blade section for pivotal movement within the vacuum chamber. Preferably, the pivotal connections of the blade sections are made by structures electrically isolated from one another with a shunt to bypass electric current around the pivotal connection.

The limiter blade preferably has a generally elliptic outline in the poloidal direction of the vacuum chamber, and the blade sections preferably each have a convex contour generally elliptic in the toroidal direction of the vacuum chamber to provide acceptable patterns for the heat flux across the blade sections.

The blade sections may each be formed by a respective backing plate carrying a plurality of graphite tiles each coated with titanium carbide or other material providing a non-reactant barrier resistant to sputtering. The backing plates preferably contact the underside of the respective tiles for conducting heat away from the tiles, and means are provided for circulating a coolant through the backing plates.

The circulating means may include channels formed within the respective backing plates and leading to conduits externally of the vacuum chamber. Preferably, the conduits of the upper and lower blade sections are coiled about the pivotal connections to the central blade section so that they may extend from the vacuum vessel in a direction rearward of the central blade section.

The tiles may be held to the respective backing plates by bolts threaded into nuts held within the tiles. In this way, the tiles may be removed easily from the backing plates if necessary. Spring washers are preferably held between enlarged heads of the bolts and the underside of the respective backing plate to assure the tiles will be held in close contact with the backing plates during thermal transients. The backing plates may further have an array of thermocouples having their junctions extending resiliently from the respective backing plate to provide pressure contact with the underside of the tiles. In this way, the temperature of the tiles can be monitored accurately.

The three blade sections are movable by respective actuators connected to the backing plates. The central blade section preferably has its backing plate connected to a midplane actuator movable linearly, and the backing plates of the upper and lower blade sections may each have a respective guide portion receiving rollers held to end actuators movable linearly. In this way, the upper and lower blade sections can be pivoted by linear motion of the end actuators.

The guide portions receiving the rollers of the end actuators may each be formed by a pair of parallel bridge portions spaced outwardly from the respective backing plate. The pair of bridge portions are spaced from one another to define a guideway receiving a connector carried by the end portions of the respective end actuator. The connectors are movable longitudinally within the guideways and carry respective spherical bearings having two roller shafts extending transversely across the upper surface of the respective bridge portion and two roller shafts extending transversely across the lower surface of the respective bridge portion. The roller shafts each carry respective rollers on their end portions which are each adapted to engage a respective surface of the bridge portions. The surfaces of these connectors, spherical bearings, roller shafts and rollers that are in moving frictional contact preferably have a coating of a ceramic of high dielectric strength.

The three blade sections of the limiter blades are preferably movable as a unit from the vacuum vessel of the reactor and the guideways holding the end actuators are preferably open at their forward ends to enable the rollers to be easily engaged or disengaged from the bridge portions. Also, the upper and lower blade sections may preferably be locked in a generally horizontal position to ease removal from the vacuum vessel.

Additionally, the upper blade section and the lower blade section may each have a respective shunt strap connected to the central blade section and the pivotal connection to the central blade section may be made by structures having their mating surfaces electrically isolated from one another by an insulating coating. In this way, fault currents or the like can be made to bypass the pivotal connections to prevent any damage by arc welding. The shunt straps are preferably formed by a plurality of conductive leaves to better withstand bending stresses.

These and other advantages and features of the present invention will become more apparent from the description of a preferred embodiment of the present invention, taken in conjunction with the following drawings.

DETAILED DESCRIPTION

Figure 1:
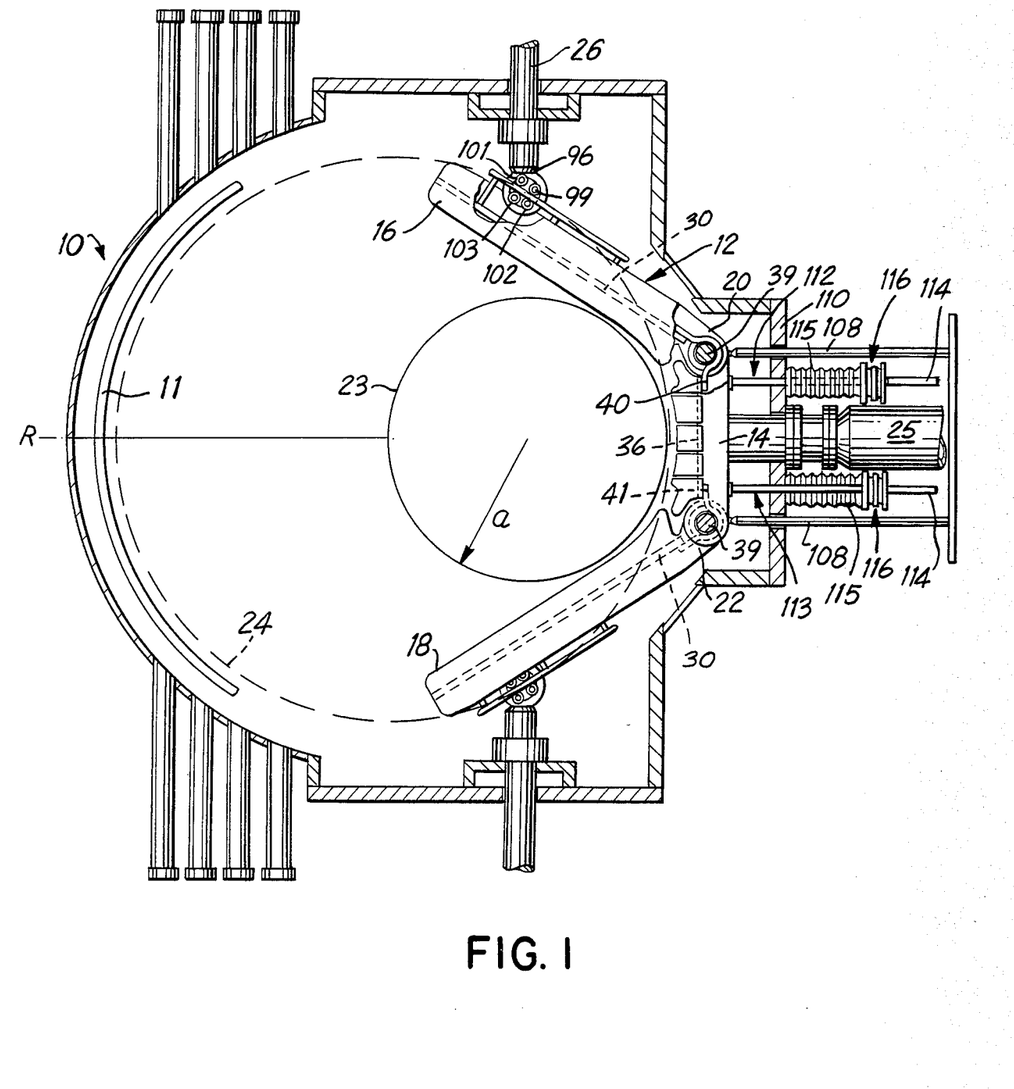
FIG. 1 is a schematic cross-sectional view through the vacuum chamber of the TFTR illustrating a movable limiter blade according to the present invention.

FIG. 1 illustrates schematically a cross-section of the vacuum chamber of the TFTR fusion reactor. The vacuum chamber is defined within a generally toroidal vacuum vessel 10 having an inner bumper limiter 11 formed continuously along the inner wall of the vacuum vessel, and a primary limiter formed by the movable limiter blade 12 of the present invention. The movable limiter blade 12 is located at the outer end of the major radius R at one toroidal position of the vacuum chamber, and includes a central blade section 14 positioned perpendicularly to the major radius R and an upper blade section 16 and a lower blade section 18 connected pivotally to respective end portions of the central blade section at respective connections 20 and 22.

The TFTR will have several operating scenarios for heating various plasmas, including ohmic heating of the plasma in a high-current mode and heating of the plasma by strong adiabatic compression. In the compression mode, the precompressed plasma having a minor radius a of approximately 55 cm is pre-heated by high energy beams while riding on the movable limiter of the present invention. This plasma, represented by the circle 23 of FIG. 1, will ride upon approximately 120° of the poloidal surface of the movable limiter 12 and will essentially be nestled within the vee formed between the upper blade section 16 and lower blade section 18. The ohmic heated plasma will have a substantially larger minor radius on the order of 82 cm and will ride on the inner bumper limiter 11 as shown by the circle 24 and the outer poloidal end of upper and lower blade sections of the movable limiter. Consequently, it will be necessary to retract the movable limiter blade along the major radius with its upper and lower blade sections spread further apart during ohmic heating of such plasma.

The three blade sections of the movable limiter 12 are individually movable to accomodate plasmas of different sizes. As shown in FIG. 1, the central blade section 14 is movable along the major radius by R actuator 25, and the upper and lower blade sections may each be pivoted by respective actuators 26 and 28 between a generally horizontal position and a maximum angular position forming an angle of approximately 32° with the major radius R.

Figure 2:
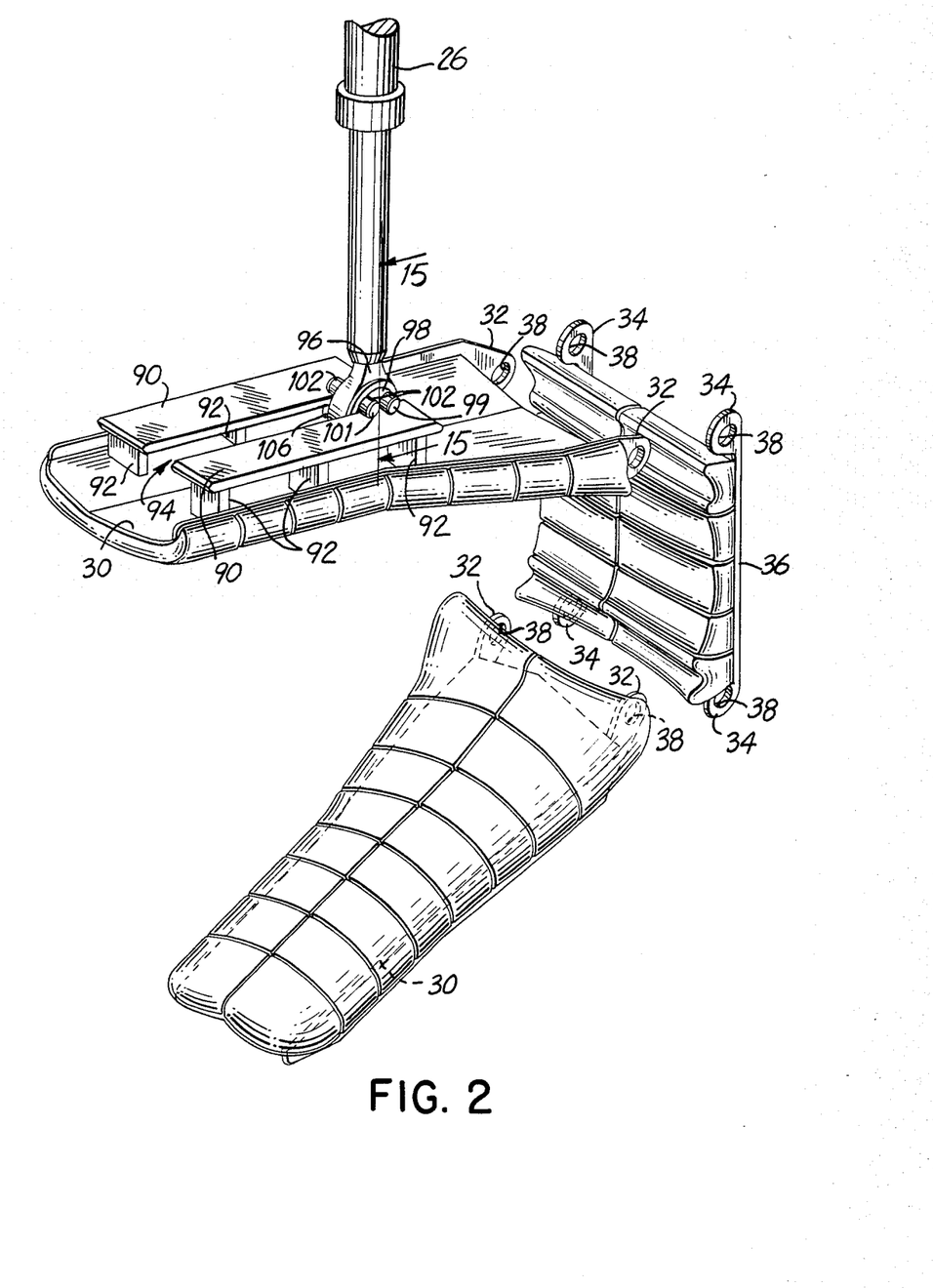
FIG. 2 is an exploded view of the movable limiter blade showing essential features thereof.
Figure 3:
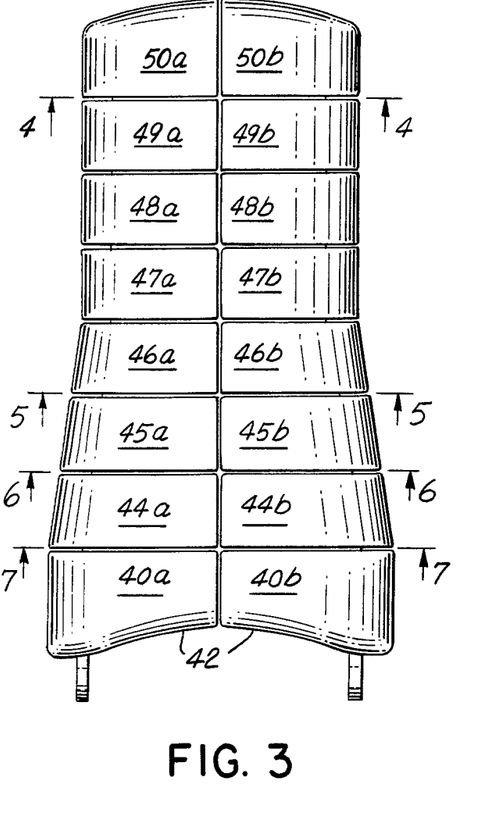
FIG. 3 is a plan view of one of the pivotal blade sections of the movable limiter blades.
Figure 4:
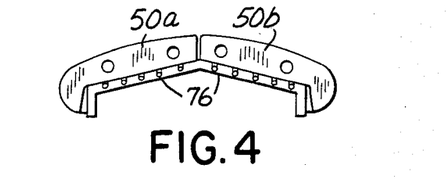
FIG. 4 is a section section taken along line 4—4 of FIG. 3.
Figure 5:
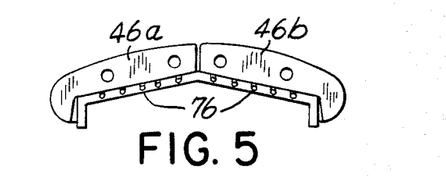
FIG. 5 is a section taken along line 5—5 of FIG. 3.
Figure 6:
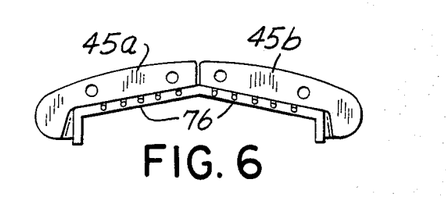
FIG. 6 is a section taken along line 6—6 of FIG. 3.
Figure 7:
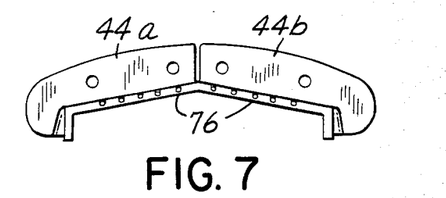
FIG. 7 is a section taken along line 7—7 of FIG. 3.
Figure 8:
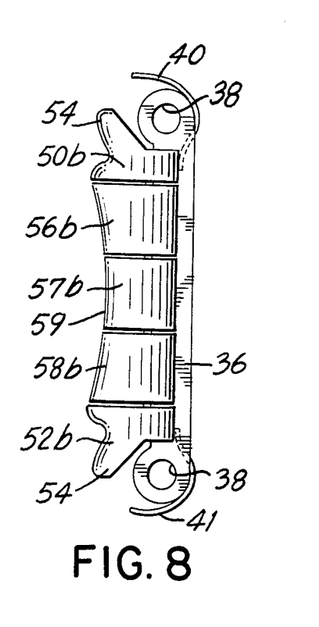
FIG. 8 is a side view of the central blade section of the movable limiter blade.
Figure 9:
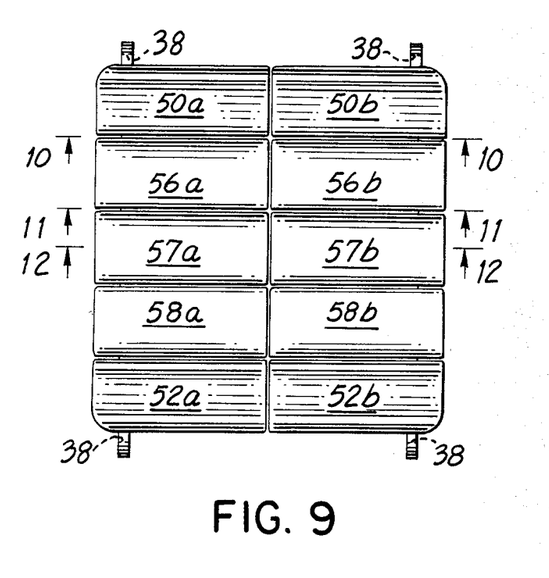
FIG. 9 is a plan view of the of the central blade section of the movable limiter blade.
Figure 10:
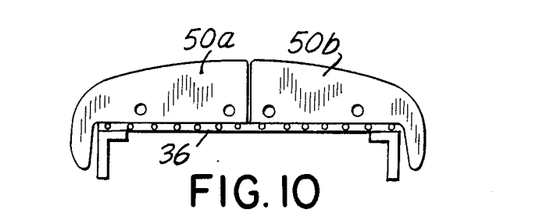
FIG. 10 is a section taken along line 10—10 of FIG. 9.
Figure 11:
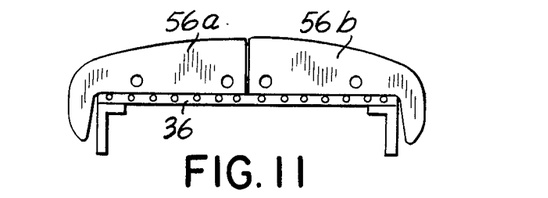
FIG. 11 is a section taken along line 11—11 of FIG. 9.
Figure 12:
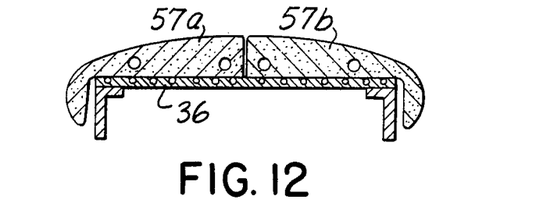
FIG. 12 is a section taken along line 12—12 of FIG. 9.

The blade sections are preferably formed of respective backing plates carrying a plurality of heat-resistant graphite tiles, each coated with titanium carbide or other material providing a non-reactant barrier resistant to sputtering. The upper and lower blades are essentially identical and, as shown in FIG. 2, each includes a rigid backing plate 30 having a generally V-shaped section to add rigidity. The backing plates 30 each include a respective stub portion 32 adapted to fit with a mating stub portions 34 formed on the end portions of the generally planar backing plate 36 for the central blade section. These stub portions have aligned openings 38 for receiving pivot shafts 39 serving to pivotally connect the blade sections. In this way, the upper and lower blade sections are supported pivotally from the backing plate of the central blade in essentially a cantilevered manner.

The backing plates for the three blade sections provide the structural support for the limiter blade 14 and are made of a stainless steel material, such as Inconel 625, having a low magnetic permeability and sufficient strength to withstand the mechanical loading expected during operation. Such loading may result from plasma disruptions inducing eddy currents in the limiter blade which react with the rapidly changing magnetic field, or during plasma faults when as much as 24 kA of the plasma current may be grounded through the backing plates to provide a current crossing the remaining magnetic field. The pivot shafts 39 are preferably coated with an alumina coating of approximately 87% $Al_2O_3$ and 13% $TiO_2$, such as Metco-130, to reduce wear and electrically isolate the sliding pivotal surfaces from one another, and shunt straps 40 and 41 respectfully connect the upper blade section and the lower section to the central blade section. These shunt straps are preferably formed by a plurality of conductive leaves held to the respective backing plates by redundant fasteners providing contact conductance between the shunt straps and the backing plates. In this way, the danger of the pivotal connections of the limiter blade being fused by arc welding during plasma faults producing up to approximately 10 kV can largely be avoided.

The backing plates each carry a plurality of graphite tiles coated with titanium carbide or other material as described above to reduce erosion of the graphite material by arcs, sublimation and sputtering from the high-energy plasma. The tiles are preferably formed of Poco AXF-5Q graphite and are shaped to distribute the head flux evenly throughout the tiles. As shown in FIGS. 1 and 2, the blade sections of the movable limiter blade form a generally elliptic outline in the poloidal direction of the vacuum chamber, and the three blade sections each have a convex contour generally elliptic in the poloidal of the vacuum chamber. In this way, the heat loads applied by even the most energetic plasmas expected during operation will be distributed uniformally throughout the tiles.

The pivotal upper blade section 16 and pivotal lower blade section 18 are essentially identical and are illustrated in FIGS. 3 through 7. As shown in the plan view of FIG. 3, these pivotal blade sections have a symetric pair of inner tiles 40a and 40b arranged side by side and having a contoured inner surface 42 adapted to mate with the end tiles of the central blade section. Adjacent the inner tiles 40a and 40b are a series of symetric pairs of tiles 44a and 44b through 46a and 46b tapering inwardly toward a straight run of symetric tile pairs 47a and 47b through 50a and 50b. As shown most clearly in FIG. 2, the inner tiles 40a and 40b and tiles 44a and 44b through 46a and 46b form a surface angling outwardly to the straight surface formed by the tiles 47a and 47b through 50a and 50b, to provide generally elliptic poloidal contour of the limiter blade.

The central blade section 14 is illustrated more specifically in FIGS. 8 through 12, and includes symmetric pairs of end tiles 50a and 50b at its upper end and symmetric pairs of end tiles 52a and 52b at its lower end. These end tiles each include projecting portions 54 configured to ride beneath the mating surface 42 of the end tiles of the pivotal blade sections. Extending between the end tiles, are symmetric pairs of central tiles 56a and 56b through 58a and 58b. The outer surface of the central tiles form a compound curve having a generally elliptic contour 59 in the poloidal direction and a convex curve in the toroidal direction as illustrated in the figures.

Figure 16:
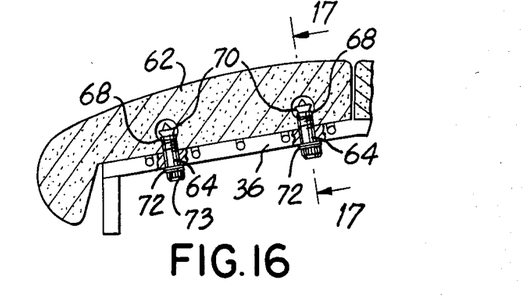
FIG. 16 is a section through one of the blade sections schematically showing the connection of a tile to a backing plate.
Figure 17:
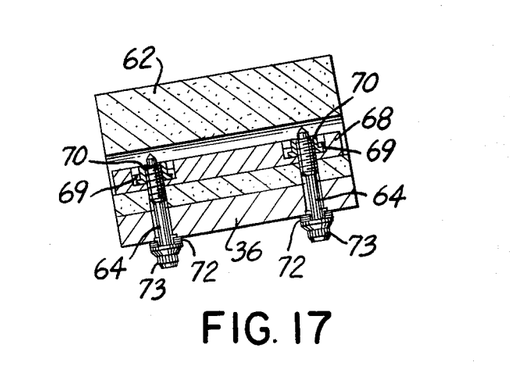
FIG. 17 is a section taken along line 17—17 of FIG. 16.

The underside of each tiles is generally planar and is held in contact with the respective backing plate to transfer heat from the tiles to the backing plates. As shown in FIGS. 16 and 17, illustrating a tile 62 held to the backing plate 36 for the central blade section, the tiles are held to the respective backing plates by bolts 64 threaded into nuts held within the tiles. Preferably, the tiles are each held by bolts located in corner portions of the respective tile, and include an elongate annealed bar 68 of Nitronic-60 captured within each side portion of the respective tile. The bars 68 run along the tile and have spaced recesses 69 each capturing a respective barrel nut 70 receiving a bolt 64. Spring washers 72 are preferably held between the heads 73 of the bolts and the underside of the backing plate to assure the tiles will be continually held in close contact with the backing plates.

Figure 13:
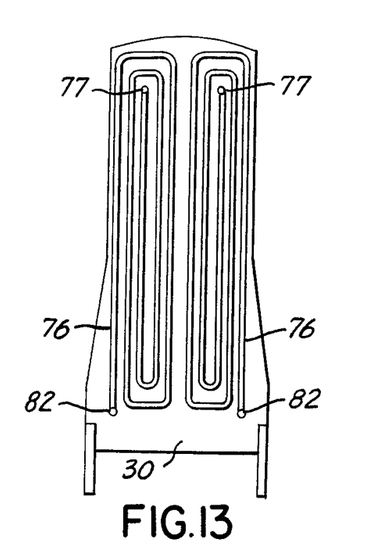
FIG. 13 is a plan view of the backing plate for one of the pivotal blade sections.
Figure 14:
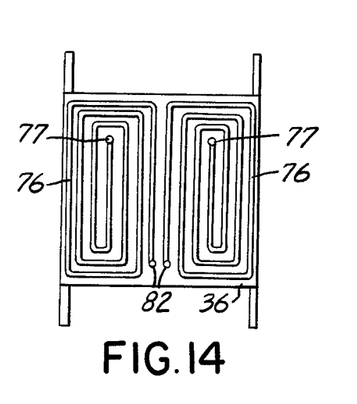
FIG. 14 is a plan view of the backing plate for the central blade section.

Each of the backing plates has channels formed in its upper surface for circulating a coolant through the backing plates to conduct heat away from the tiles. As shown in FIG. 13 for the pivotal backing plates 30 and FIG. 14 for the central backing plate 36, individual flow channels 76 are formed symetrically on respective sides of the backing plates. These flow channels each contain conduits formed from annealed tubing of Inconel 600 and filled within the channels by being vacuum brazed therein with an alloy of approximately 35 wt % gold, 62 wt % copper and 3 wt % nickel, such as Nicoro alloy.

Figure 18:
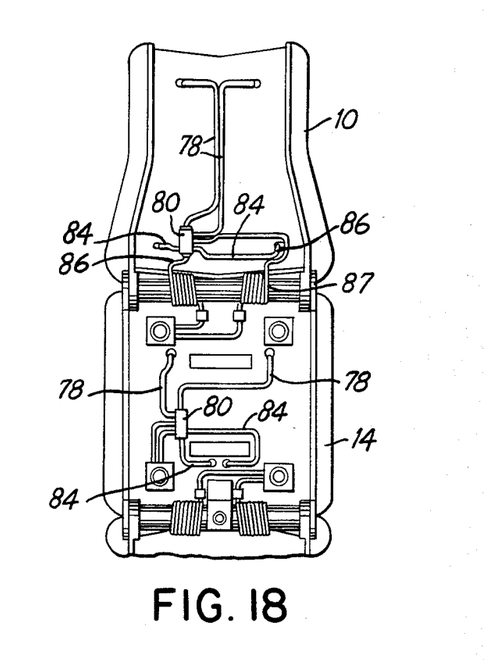
FIG. 18 is a plan view of the back side of a pivotal blade section and the central blade section.

The coolant inlet 77 of each of the conduits 76 extends through the respective backing plate and connects with a tubular conduit 78 leading to a respective manifold 80 as shown in FIG. 18. The conduits 76 extend continuously along the respective backing plates, as shown, to outlets 82 which also extend through the backing plates to connect with tubular conduits 84 leading back to the manifolds. The fluid connections to the manifolds of the pivotal blade sections are made by conduits 86 coiled about the pivotal connections for the pivotal blade sections, as shown by coiled tubing 87 of FIG. 18. These conduits 86 may, therefore, be led outwardly of the vacuum chamber in a direction parallel to the actuator 25 of the central blade section. The various conduits are connected together by welding so as to avoid the use of bolted connections within the vacuum chamber.

Additionally, the backing plates may have an array of thermocouples having their junctions extending resiliently from the respective backing plates so as to be held in pressure contact with the underside of the tiles even during thermal transients, to thereby monitor the temperature of the tiles. In a manner similar to the conduits 86, the leads from the thermocouples from the pivotal blade sections 16 and 18 can be coiled about the respective pivotal connections to the central blade section and, therefore, be led from the vacuum chamber in a direction parallel to the actuator 25.

Figure 15:
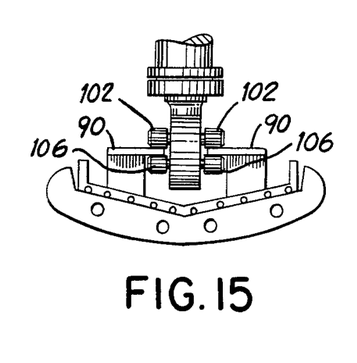
FIG. 15 is a section taken along line 15—15 of FIG. 2.

The actuator 25 is the primary support for the blade 12 and is connected to the central blade section 14 rigidly. The actuator 25 is movable linearly through a stroke of approximately 20 cm to move the central blade section along the major radius R of the vacuum chamber. The actuators 26 and 28 for the pivotal blade sections are movable linearly in the vertical direction. The actuators 26 and 28 and their connections to the pivotal blade sections are essentially identical and are illustrated in FIG. 2 and FIG. 15.

As shown in the figures, the backing plates 30 of the pivotal blade sections have a pair of parallel bridge portions 90 spaced outwardly from the backing plate. The bridge portions 90 are formed of high-strength Inconel-718 which has been precipitation hardened and are bolted to strut portions 92 extending upwardly from the backing plate.

The bridge portions 90 are spaced laterally from one another to define therebetween a passageway 94 open at its forward end. Fitted to the end of each actuator 26 and 28 is a respective head portion 96 forming a connector carrying a spherical bearing 98 carrying four roller shafts. These roller shafts include upper shaft 99 and 101 extending transversely across the upper surface of the respective bridge portion and carrying rollers 102 at their ends to ride along the upper surface of the bridge portions. Additionally, two roller shafts 103 and 104 extend transversely along the lower surface of the bridge portion and carry rollers 106 at their ends which ride along the lower surface of the bridge portion. In this way, the bridge portions are captured between the upper and lower rollers which roll along the bridge portions to alter the position of the blade sections upon linear movement of the respective actuator. The spherical bearings 98 allow the various rollers to adjust their positions to compensate for any misalingment and allow smooth articulation of the pivotal blade sections. Preferably, all surfaces in moving frictional contact are protected from arcing or galling with a ceramic bearing coating with high dielectic strength such as the Metco-130 noted above. Also, a dry lubricant of molybdenum disulfide is used where possible on the bearing surface.

The movable blade 12 is removable as a unit from the vacuum chamber. To remove the limiter blade 12, the pivotal blade sections are placed in their horizontal positions. Blade locks 108 are provided which have tapered forward ends adapted to fit within tubular passages formed within the end portions of the pivotal blade section to hold them in their horizontal position. The port cover 110 may then be removed from the vacuum vessel to withdraw the limiter blade 12 from the vacuum vessel as the rollers slide off the open forward end of the bridge portions. The port cover 110 is preferably attached to the actuator 25 so as to be removed as a unit with the limiter blade. Since the coolant and the instrument lines all extend parallel to the actuator 25, they do not interfere with removal of the limiter blade 12 from the vacuum vessel. Preferably, the coolant and instrument lines are held in rigid masts 112 and 113 connected rigidly to the central backing plate 14. Coolant and instrumentation signals are supplied by connection elements 114 which have electrical insulating capability.

The coolant and instrument lines will be subjected to high voltages due to their connection to the limiter blade 12 and must be electrically isolated from the walls of the vacuum vessel. To this end, the masts 112 and 113 may have an outer alumina sheath to isolate these structures electrically from the vacuum vessel. The limiter blade is electrically insulated from the actuator housing 25 by internal alumina inserts. Additionally, the masts 112 and 113 have a respective bellows 115 formed of a non-magnetic, conductive material such as a stainless steel fitted therearound. The bellows 115 are flexible and maintain the vacuum inside the vessel 10. A high voltage insulator 116 insulates the masts 112 or 113 electrically from the bellows 115 while maintaining the vacuum boundary.

The present invention has been described with reference to the specific embodiment described above. The invention, however, is not limited to this embodiment, but is set forth in the appended claims.

I claim:

1. In a fusion reactor having a generally toroidal vacuum chamber wherein is confined a plasma having an outer boundary and wherein said vacuum chamber and said plasma are characterized as having respective major and minor radii, a limiter blade for defining the outer boundary of said plasma comprising a plurality of blade sections including a central blade section arranged generally perpendicularly to the major radius of the vacuum chamber and movable along said major radius, and an upper blade section and a lower blade section connected pivotally to respective end portions of said central blade section for pivotal movement within said vacuum chamber for adjusting to the minor radius of a plasma therewithin.

2. A limiter blade according to claim 1, said blade sections each having a convex contour generally elliptic in the toroidal direction of the vacuum chamber.

3. A limiter blade according to claim 1, said backing plates each including a surface contacting the underside of the respective tiles for conducting heat away from said tiles and including means for circulating a coolant through said backing plate.

4. A limiter blade according to claim 3, said circulating means including channels formed within said respective backing plates and leading to conduits extending externally of the vacuum chamber, the conduits of said upper and lower blade sections being coiled about the pivotal connection to said central blade section to the exterior of said vacuum chamber.

5. A limiter blade according to claim 1, said tiles being held to the respective backing plate by bolts threaded into nuts held within said tiles.

6. A limiter blade according to claim 5, having means including spring washers held between an enlarged head of the respective bolt and the underside of the respective backing plate for maintaining the contact pressure between the tiles and respective backing plate.

7. A limiter blade according to claim 1, said backing plates each having means including an array of thermocouples each having its junction extending resiliently from said backing plate into pressure contact with the underside of a tile for monitoring the temperature of said tiles.

8. A limiter blade according to claim 1, said blade sections each being formed of a respective backing plate carrying a plurality of graphite tiles, the backing plate of said central blade section being connected to a midplane actuator movable linearly, and the backing plates of said upper and lower blade sections each having a respective guide portion receiving rollers held to a respective end actuator movable linearly whereby said upper and lower blade sections can be pivoted by linear motion of the respective end actuator.

9. A limiter blade according to claim 8, said guide portions each being formed by a pair of parallel bridge portions spaced outwardly from the respective backplate, said pair of bridge portions being spaced from one another to define a guideway receiving a connector carried by end portions of the respective end actuators, and movable longitudinally of said guideway, said connector each carrying a respective spherical bearing having two roller shafts extending transversely across the upper surface of the respective bridge portion and two roller shafts extending transversely across the lower surface of the respective bridge portions, said roller shafts each carrying respective rollers on their end portions each adapted to engage a respective surface of the bridge portions.

10. A limiter blade according to claim 9, the surfaces of said connectors, spherical bearing, roller shafts, and rollers in moving frictional engagement having a coating of ceramic of high dielectric strength.

11. A limiter blade according to claim 9, said guideways each being open at their forward end to enable said roller to be easily engaged with or disengaged from the respective bridge portions.

12. A limiter blade according to claim 1, said upper blade section and said lower blade section each having at least one respective shunt strap connected to said central blade section.

13. A limiter blade according to claim 12, wherein each of said shunt straps is formed of a conductive leaf.

14. A limiter blade according to claim 1, said blade sections being movable as a unit from the vacuum vessel of the reactor and including respective end actuators removably connected to a backing plate of said upper blade section and a backing plate of said lower blade section, said backing plates each including means for circulating a coolant therethrough, said circulating means including conduits extending from said respective backing plates and being coiled about the respective pivotal connection to said central blade section, said conduits extending rearwardly from said central blade section to the exterior of said vacuum vessel.

15. A limiter blade according to claim 14, including means for locking said upper and lower blade sections in a generally horizontal position for removal from the vacuum chamber.

16. A limiter blade according to claim 14, said conduits exiting the vacuum chamber through respective masts, said masts being connected to said vacuum chamber by a flexible, conductive bellows in series with a vacuum tight electrical insulator.

17. A limiter blade according to claim 1, said limiter blade having a generally elliptic outline in the poloidal direction of the vacuum chamber.

18. A limiter blade according to claim 2, said limiter blade having a generally elliptic outline in the poloidal direction of the vacuum chamber.

19. A limiter blade according to claim 1, said blade sections each being formed of a respective backing plate carrying a plurality of graphite tiles each coated with titanium carbide.

20. A limiter blade according to claim 2, said blade sections each being formed of a respective backing plate carrying a plurality of graphite tiles each coated with titanium carbide.

21. A limiter blade according to claim 1, said upper and lower blade sections being connected pivotally to said control blade sections by structures having their mating surfaces electrically isolated from one another by an insulative coating.

22. A limiter blade according to claim 12, said upper and lower blade sections being connected pivotally to said central blade sections by structures having their mating surfaces electrically isolated from one another by an insulative coating.

* * * * *